(No Model.)

J. S. STIDHAM.
ICE CREAM FREEZER.

No. 516,947. Patented Mar. 20, 1894.

WITNESSES:
Fred G. Dieterich
P. B. Turpin.

INVENTOR
James S. Stidham
BY Munn & Co.
ATTORNEYS.

UNITED STATES PATENT OFFICE.

JAMES S. STIDHAM, OF FLOYD, TEXAS.

ICE-CREAM FREEZER.

SPECIFICATION forming part of Letters Patent No. 516,947, dated March 20, 1894.

Application filed December 19, 1893. Serial No. 494,103. (No model.)

*To all whom it may concern:*

Be it known that I, JAMES S. STIDHAM, of Floyd, in the county of Hunt and State of Texas, have invented a new and useful Improvement in Ice-Cream Freezers, of which the following is a specification.

My invention is an improvement in ice cream freezers and has for an object to provide a novel construction and relative arrangement of the refrigerating box and the cream cups as will be described whereby to secure a more compact and convenient arrangement of cups and also to effect a rapid and thorough freezing of the cream as desired.

The invention consists in the novel constructions and combinations and arrangements of parts as will be hereinafter described and pointed out in the claims.

Figure 1:
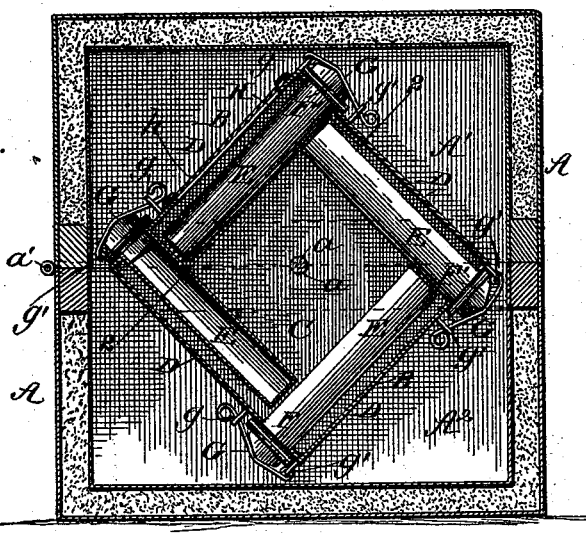
Figure 2:
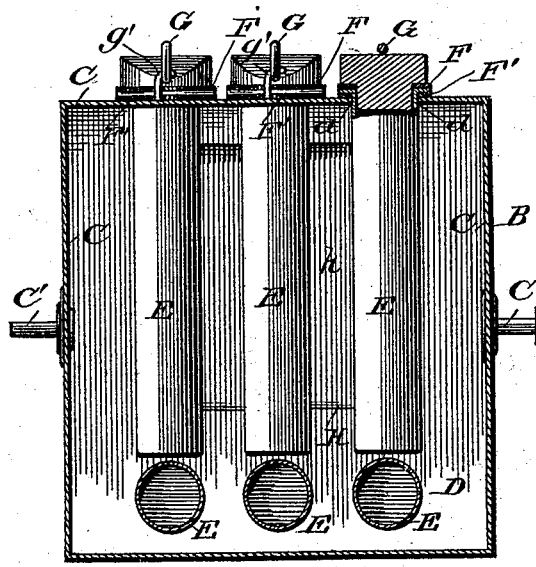
Figure 3:
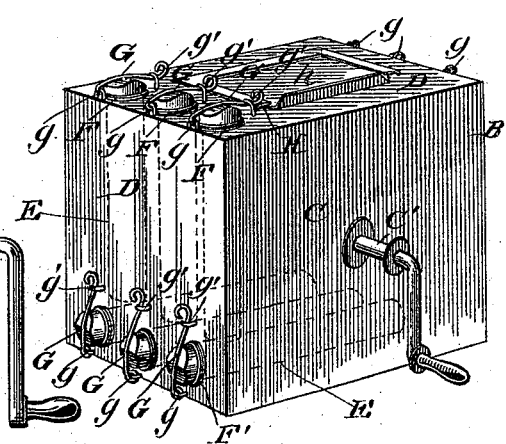

In the drawings, Figure 1 is a vertical longitudinal section of a freezer constructed according to my invention. Fig. 2 is a detail section of the refrigerating box on about line 2—2, Fig. 1, drawn alongside one of the series of cream cups, and Fig. 3 is a detail perspective view of the refrigerating box.

In practice I provide a casing A having insulated walls provided with bearings at $a$ for the trunnions of the refrigerating box and preferably made in sections A' A² hinged at $a'$ as shown. This insulated form of casing is preferred because by it I am enabled after the cream or ices are frozen, to preserve them for quite a time without replenishing the ice or other refrigerating agent as will be readily understood.

The refrigerating box B has the ends C which are provided with the trunnions C' fitted in the bearings $a$ and one of which is provided with a crank handle by which the refrigerating box may be turned. The sides D of the box are flat and are preferably arranged at right angles to their adjoining sides as shown, the box being therefore rectangular in cross section as shown. In the sides D and near one end thereof I provide openings $d$ for the cream cups and these openings $d$ are all formed at the same end (front or rear) of their respective sides. Thus with respect to one direction of motion of the box the openings $d$ will all be at the front end of the sides while with respect to the opposite direction of motion they will all be at the rear ends of the sides in which they are formed, the purpose of such location of the openings $d$ being to permit the arrangement of the cream cups presently described. These cream cups E are inserted one in each opening $d$ and extend when so placed approximately parallel to the next side to that in which they are inserted and held and preferably each cup extends to or nearly to the cups in the next side of the refrigerating box. By providing a series of openings $d$ in each side and extending such openings practically from head to head of the box I furnish within the box a plurality of series of cream cups so arranged as to form a lining within the ice box so that every cup will be exposed throughout its length to the action of the refrigerating agent and afford ample space in the box for the broken ice or other such agent as desired. In practice I provide the cream cups with shoulders to rest upon the box and with plugs or other suitable covers and to secure a tight joint I provide rubber or similar gaskets at F and F' to seal the plug and shoulder joints as shown. Each plug is held in place by a lever G pivoted at $g$ and engaged at $g'$ with a hook like bearing upon the side of the box.

To supply or replenish the ice I provide in one side of the box an opening H covered by a slide $h$, by opening which and removing the cream cup immediately below such opening access is afforded to the interior of the refrigerating box as will be readily understood from the drawings.

Having thus described my invention, what I claim as new, and desire to secure by Letters Patent, is—

1. In a freezer substantially as described a refrigerating box rectangular in cross section and having a number of flat sides and having its several such sides provided near one end with openings for the cream cups, the cream cups fitted in said openings and extended each approximately parallel to the next side to that in which the cup is inserted and retaining devices for securing such cups substantially as shown whereby the cream cups will extend one after the other in the direction of their lengths around the refrigerating box as and for the purposes set forth.

2. In a freezer substantially as described a refrigerating box rectangular in cross section and having its ends provided with journaled bearings and its flat sides provided each with openings at one end close to its juncture with the adjacent side, the cups fitted in such openings and extended approximately parallel with the adjacent side of the box and retaining devices for said cups all substantially as set forth.

3. In a freezer substantially as described, a refrigerating box made rectangular in cross section with flat sides, provided in its several sides at one end with cup openings, such openings being all arranged at the same end (that is either front or rear) with respect to the direction of motion of the box, of their respective sides, the cups fitted and held in said openings and each extended parallel to the adjacent side to that in which it is held all substantially as and for the purposes set forth.

4. In a freezer substantially as described, a refrigerating box made rectangular in cross section and having its several sides provided near one of their ends with a series of cup openings, all the openings being arranged at the same, front or rear, end of their respective sides the cups fitted in said openings and extended approximately parallel to the side adjacent to that in which they are fitted and the cups of each series being made of such length as to extend to or nearly to those of the next series whereby to form a wall of cups within the refrigerating box, and retaining devices whereby each cup is held to the box independent of the others all substantially as and for the purposes set forth.

5. In a freezer a refrigerating box journaled at its ends and having its sides provided at intervals with cup openings and the cups fitted in said openings, each of said cups being extended longitudinally past the end of the cup next thereto with respect to the direction of motion of the box, all substantially as and for the purposes set forth.

JAMES S. STIDHAM.

Witnesses:
H. C. MOORE,
H. T. WEATHERS.